No. 618,174. Patented Jan. 24, 1899.
R. H. HENNEMEIER.
DRIVING GEAR.
(Application filed Jan. 5, 1898.)
(No Model.)
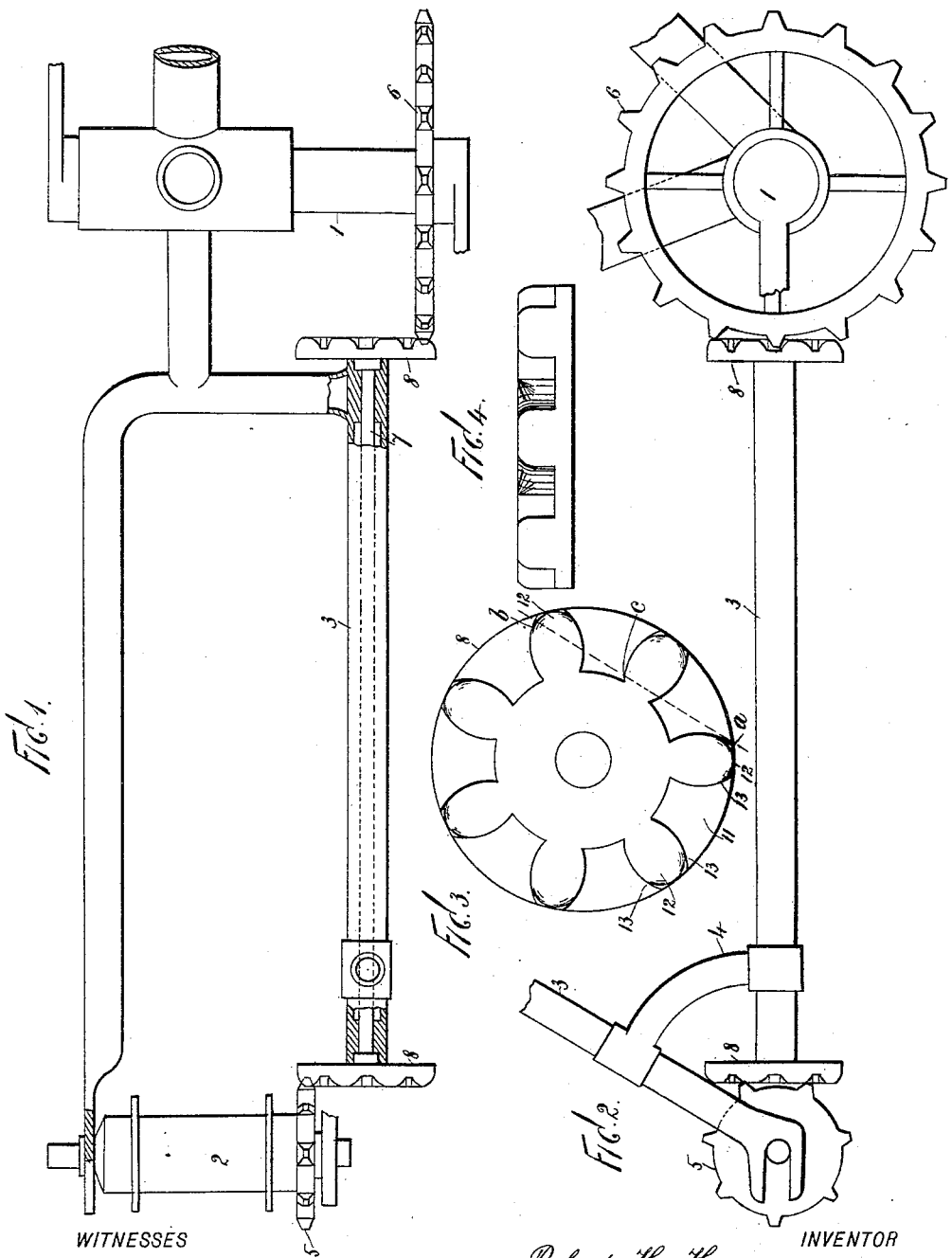
WITNESSES
John Buckler,
C. C. Olsen.
INVENTOR
Robert H. Hennemeier
BY
Edgar Tate
ATTORNEYS
THE NORRIS PETERS CO., PHOTO-LITHO., WASHINGTON, D. C.

UNITED STATES PATENT OFFICE.

ROBERT H. HENNEMEIER, OF NEW YORK, N. Y.

DRIVING-GEAR.

SPECIFICATION forming part of Letters Patent No. 618,174, dated January 24, 1899.

Application filed January 5, 1898. Serial No. 665,605. (No model.)

*To all whom it may concern:*

Be it known that I, ROBERT H. HENNEMEIER, a citizen of the United States, residing at New York, in the county of New York and State of New York, have invented certain new and useful Improvements in Driving-Gears for Bicycles, of which the following is a full and complete specification, such as will enable those skilled in the art to which it appertains to make and use the same.

This invention relates to a novel driving-gear for bicycles and for other purposes, and has for its object to provide a construction obviating the employment of a chain, and which can be applied to bicycles having sprocket-wheels adapted for a chain-gearing—that is to say, the invention contemplates a chainless gearing between the driving-sprocket of the pedal-shaft and the driven sprocket of the driving-wheel, a further object of the invention being to produce an improved gear-wheel capable of meshing with sprocket-wheels and presenting many incidentally advantageous characteristics.

The invention consists in the features of construction and combinations of parts hereinafter fully described and specifically claimed.

The invention is fully disclosed in the following specification, of which the accompanying drawings form a part, in which the separate parts of my improvement are designated by the same letters and numerals of reference in each of the views, and in which—

Figure 1 is a fragmentary plan view illustrating a portion of the bicycle-frame and gearing constructed in accordance with this invention. Fig. 2 is a side elevation thereof. Fig. 3 is a face view of the face-wheel on an enlarged scale. Fig. 4 is a side elevation.

In the drawings forming part of this specification, 1 indicates the pedal-shaft, 2 the hub of the driving-wheel, and 3 the frame, having a brace 4 between the lower rear reach and rear brace. The driving-wheel is provided with the usual toothed wheel or sprocket-pinion 5, while the pedal-shaft has its usual toothed or sprocket wheel 6, said toothed wheels being adapted for use in connection with the ordinary sprocket-chain. This invention, however, embraces a chainless gearing between the toothed sprocket-wheels, consisting of a shaft 7, having face gear-wheels 8 of peculiar construction at its ends, designed to intermesh with the toothed or sprocket wheels 5 and 6. The novel gearing, it is apparent, can be applied to bicycles built for a sprocket-chain gearing by slight changes to vary the relative positions of the toothed or sprocket wheels. In this way a chainless-gear machine can be made without the necessity of new gears for the pedal-shaft and driving-wheel. The said face-wheels 8 are of novel construction to enable the proper intermeshing with the toothed or sprocket wheels 5 and 6, and are shown in details in Figs. 3 and 4. The wheel 8 consists of a disk having a plurality of radial recesses 11 in one side, extending inwardly from the periphery to form the teeth 12. The outer corner portions of these teeth are beveled, as shown at 13, to properly conform to the contour of the sprockets and intermesh therewith.

In operation two of the teeth of the toothed or sprocket wheel touch the face-wheel at the same time, and, as shown in Fig. 3, the tooth leaving the face-wheel is at a point marked $a$, and as said tooth clears the face-wheel the tooth beginning to act thereon is at a point marked $b$, which it engages as the first tooth leaves the face-wheel, and the intermediate tooth or one in most active engagement with the face-wheel is at a point marked $c$, it being understood that the toothed or sprocket wheel does not touch the face-wheel simultaneously at each of the three points, but only at two of the same, first at $a$ and $c$ and (as the leaving tooth clears point $a$) then at $c$ and $b$. The beveled portions 13 of the teeth 12 enable the teeth of the toothed or sprocket wheel to properly engage therewith at the commencement and termination of their engagement, it being seen that the first point of contact of the teeth beginning to act on the face-wheel is at the outer end or point $b$ of the face-wheel or tooth 12 thereof, the point of contact moving inwardly to the face of the tooth as the parts rotate, and it is at the inward position that the tooth of the toothed or sprocket wheel operates to turn the face-wheel, after which the point of contact moves again outwardly to the end of the tooth, as shown at $a$. I find that this movement of the face-wheel by the teeth of the toothed or sprocket wheel is effected with very little friction, mainly by reason of this changing or moving point of contact of the teeth.

In the usual forms of face-wheels or crown-wheels it is well known that the point of contact of the teeth is stationary and that there is but a tangential thrust exerted upon the driven face-wheel, and that, moreover, in common face and edge wheel gearing so great a length of thrust is not possible as that illustrated in Fig. 3 of the accompanying drawings. Moreover, it is a characteristic of such gearing that the teeth are equal in peripheral and radial width, (or those of the edge gear are a trifle wider radially,) whereas a novel distinguishing characteristic of my improved gearing is that the toothed or sprocket wheel has its teeth peripherally and radially narrower and mutually distant to a much greater degree, corresponding in spacing more to the radial width of the face-wheel teeth and not correlatively to the peripheral width thereof. This gearing is comparatively noiseless, first, by reason of the construction and form of my improved face-wheel, and, second, by the combination thereof with a toothed wheel, such as the sprocket-wheel shown in the drawings. Moreover, by reason of this relative radial engagement of the teeth the spaces or recesses 11 are automatically cleaned out by the radial dislodgment of the dirt, which in a bicycle always clogs unclosed gears, and this renders my improved gearing a perfectly self-cleaning one, besides enhancing its durability in consequence.

It will be seen from Fig. 1 that my improved device is capable of forming a chainless wheel. While I have in this figure shown the pedal-shaft somewhat long in proportion, I do not desire to be understood as thereby defining any proportions for the construction of the machine. The driving-wheel 6 is of course located at the best operative position for the rider, and as the rear pinion 5 is customarily in an arbitrary position it naturally follows that in proper manufacture of the device the longitudinal shaft is located between the said rear toothed or sprocket wheel 5 and the arranged pedal-wheel 6, it being noted that it is quite immaterial whether this longitudinal shaft extends exactly straight, as shown in Fig. 1. In fact, in fitting the shaft to an ordinary bicycle the position of the two toothed or sprocket wheels need not be changed from their usual alinement, it being but necessary to arrange the frame to receive the longitudinal shaft and gear-wheels, and I desire it to be understood that the mounting of this longitudinal shaft is to be effected according to the greatest apparent convenience and efficiency in operation. It is seen, therefore, that in constructing a face-wheel of this description I am enabled to convert a chain to a chainless gearing readily and with little trouble and expense, and, furthermore, make it possible to afford an interchangeable chain and chainless gear.

It is seen from the drawings that the gear of the bicycle remains unchanged in view of the fact that the two face-wheels are of equal diameter or number of teeth. Hence relative rotation of the driving and driven toothed or sprocket wheels is the same as when they are geared together by an ordinary sprocket-chain.

Having fully described my invention, I claim as new and desire to secure by Letters Patent—

1. A driving mechanism for bicycles and other purposes, comprising the combination of a toothed wheel and an improved face-gear consisting of a disk having a plurality of radial recesses in one side thereof extending inwardly from the periphery to form teeth, the said face-gear meshing with the said toothed wheel whereby the teeth thereof enter the said recesses of the face-gear and engage the said teeth formed by said recesses, substantially as shown and described.

2. A driving mechanism for bicycles and other purposes, comprising the combination with the driving and driven toothed wheels, of a longitudinal shaft mounted between the same and provided at each end with an improved face-gear consisting of a disk having a plurality of radial recesses in one side thereof extending inwardly from the periphery to form teeth, the said face-gear meshing with the said toothed wheel whereby the teeth thereof enter the said recesses of the face-gear and engage the said teeth formed by said recesses, substantially as shown and described.

3. In a driving mechanism for bicycles and for other purposes, an improved face-gear consisting of a disk having a plurality of radial recesses 11 in one side thereof extending inwardly from the periphery to form teeth 12, the outer corner portions 13 of which are beveled, substantially as shown and described.

In testimony that I claim the foregoing as my invention I have signed my name, in presence of the subscribing witnesses, this 20th day of December, 1897.

ROBERT H. HENNEMEIER.

Witnesses:
L. M. MULLER,
A. C. McLOUGHLIN.